US010305542B2

(12) United States Patent
Yan et al.

(10) Patent No.: US 10,305,542 B2
(45) Date of Patent: May 28, 2019

(54) METHOD, APPARATUS AND SYSTEM FOR CROSSTALK SUPPRESSION OF POWER LINE COMMUNICATION

(71) Applicant: Delta Electronics (Shanghai) Co., Ltd., Shanghai (CN)

(72) Inventors: Jiangtao Yan, Shanghai (CN); Feidong Xu, Shanghai (CN); Xuancai Zhu, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/866,445

(22) Filed: Jan. 9, 2018

(65) Prior Publication Data

US 2018/0227012 A1  Aug. 9, 2018

(30) Foreign Application Priority Data

Feb. 9, 2017  (CN) .......................... 2017 1 0070730

(51) Int. Cl.
*H04B 3/30* (2006.01)
*H04B 3/32* (2006.01)
*H04B 3/487* (2015.01)
*H04B 3/10* (2006.01)
*H04B 3/56* (2006.01)

(52) U.S. Cl.
CPC ................. *H04B 3/32* (2013.01); *H04B 3/10* (2013.01); *H04B 3/487* (2015.01); *H04B 3/56* (2013.01)

(58) Field of Classification Search
CPC . H04B 3/32; H04B 3/10; H04B 3/487; H04B 3/30; H04B 3/56; G09G 2320/0209; G09G 3/3696
See application file for complete search history.

(56) References Cited

U.S. PATENT DOCUMENTS

2009/0323787 A1* 12/2009 Fang .................... H04B 3/32
375/222
2011/0096931 A1*  4/2011 Ormin .................. H04R 5/04
381/22

(Continued)

*Primary Examiner* — Mounir Moutaouakil
(74) *Attorney, Agent, or Firm* — CKC & Partners Co., LLC

(57) ABSTRACT

Method, apparatus and system for crosstalk suppression of power line communication are provided. The method includes: receiving a joining request message; judging a matching state of the communication terminal based on a history matching record and communication terminal identifier, if matching state of the communication terminal is unmatched: sending a joining response message to the communication terminal; receiving an acknowledgment request message sent by the communication terminal after switch of the communication terminal is turned on; detecting voltage on power line between the communication terminal and an inverter corresponding to the power line communication transmitter, if voltage is within preset voltage range, sending an acknowledgment response message to the communication terminal; storing communication terminal identifier in history matching record and storing matching state of the communication terminal as successfully-matched. The method, apparatus and system can avoid malfunction of switch of the communication terminal during communication crosstalk.

18 Claims, 4 Drawing Sheets

(56) References Cited

U.S. PATENT DOCUMENTS

| | | | |
|---|---|---|---|
| 2012/0113154 A1* | 5/2012 | Ge | G09G 3/3614 345/690 |
| 2012/0293560 A1* | 11/2012 | Li | G09G 3/3607 345/690 |
| 2013/0271436 A1* | 10/2013 | Shiomi | G09G 3/3648 345/204 |
| 2014/0153629 A1* | 6/2014 | Gao | H04M 11/062 375/227 |
| 2015/0009793 A1* | 1/2015 | Schwager | H04B 3/32 370/201 |
| 2016/0028434 A1* | 1/2016 | Kerpez | H04B 3/32 379/406.02 |
| 2016/0105215 A1* | 4/2016 | Wang | H04B 3/32 370/201 |
| 2016/0212036 A1* | 7/2016 | Oksman | H04B 3/32 |

\* cited by examiner

METHOD, APPARATUS AND SYSTEM FOR CROSSTALK SUPPRESSION OF POWER LINE COMMUNICATION

CROSS REFERENCE TO RELEVANT APPLICATIONS

The present application claims the priority of the Chinese patent application No. 201710070730.2, entitled "METHOD, APPARATUS AND SYSTEM FOR CROSSTALK SUPPRESSION OF POWER LINE COMMUNICATION", filed on Feb. 9, 2017, the content of which is hereby incorporated by reference in its entirety.

TECHNICAL FIELD

The present disclosure relates to electrical power systems and, more particularly, to a method, an apparatus and a system for crosstalk suppression of power line communication.

BACKGROUND

Power line communication (PLC) technology employs power lines as transmission medium to convert analog or digital signals into high-frequency signals by means of the carriers, achieving long-distance transmission of the signals via the power lines, which has the advantages of long distance transmission, high channel reliability, good security confidentiality, less investment with quick returns, and capable of being synchronized with the power grid construction, etc.

However, in the PLC-based applications, due to the large number of devices, multiple power lines are usually provided to transmit high-frequency signals, and the multiple power lines are disposed in the same wire conduit to simplify the field wiring. The coupling capacitance formed between different power lines that are closed to each other will provide a wrong transmission path for the PLC-based high frequency signals, thereby incurring crosstalk among the signals sent to different devices, resulting in the device executing misoperation based on erroneous high frequency signals, which will seriously affect the safety of the electrical equipment.

SUMMARY

In view of the above-mentioned drawbacks of the prior art, the present disclosure provides a method, an apparatus and a system for crosstalk suppression of power line communication to overcome the crosstalk problem.

One aspect of the present disclosure provides a method for crosstalk suppression of power line communication, applied to a power line communication transmitter, the method includes:

receiving a joining request message, the joining request message including an identifier of a communication terminal, for example a rapid shutdown device;

judging a matching state of the communication terminal in accordance with a history matching record and the identifier of the communication terminal, and if the matching state of the communication terminal is unmatched:

sending a joining response message to the communication terminal, the joining response message including the identifier of the communication terminal and an identifier of the power line communication transmitter;

receiving an acknowledgment request message which is sent by the communication terminal after a switch thereof is turned on;

detecting a voltage on a power line between the communication terminal and an inverter corresponding to the power line communication transmitter; if the voltage is within a preset voltage range, sending an acknowledgment response message to the communication terminal, the acknowledgment response message including the identifier of the communication terminal and the identifier of the power line communication transmitter; and storing the identifier of the communication terminal in the history matching record and storing the matching state of the communication terminal as successfully-matched.

According to another aspect of the present disclosure, there is provided a method for crosstalk suppression of power line communication, applied to a communication terminal, including:

sending a joining request message, the joining request message including an identifier of the communication terminal;

receiving a joining response message which is sent by a power line communication transmitter after determining a matching state of the communication terminal being unmatched, verifying the identifier of the communication terminal in the joining response message, and if verification is passed, storing the identifier of the power line communication transmitter in the joining response message, and turning on a switch of the communication terminal;

sending an acknowledgment request message to the power line communication transmitter;

receiving an acknowledgment response message which is sent by the power line communication transmitter after determining that a voltage on a power line between the communication terminal and an inverter corresponding to the power line communication transmitter is within a preset voltage range;

verifying the identifier of the communication terminal and the identifier of the power line communication transmitter in the acknowledgment response message; and if verification is passed, storing the identifier of the power line communication transmitter in a matching record of the communication terminal.

According to another aspect of the present disclosure, there is provided a power line communication transmitter and a communication terminal, for performing the method for crosstalk suppression of power line communication in the above-described embodiments, the power line communication transmitter and the communication terminal have the same technical features and technical effects with the method for crosstalk suppression of power line communication, which will not be repeated in the present disclosure.

According to still another aspect of the present disclosure, there is provided a power line communication transmitter including:

a receiving unit, configured to receive a joining request message, the joining request message including an identifier of a communication terminal;

a processing unit, configured to determine a matching state of the communication terminal according to a history matching record and the identifier of the communication terminal;

a sending unit, configured to send a joining response message to the communication terminal when the processing unit determines that the matching state of the communication terminal is unmatched, the joining response message including the identifier of the communication terminal and an identifier of the power line communication transmitter;

where the receiving unit is also configured to receive an acknowledgment request message which is sent by the communication terminal after a switch of the communication terminal is turned on;

a voltage detection unit, configured to detect a voltage on a power line between the communication terminal and an inverter corresponding to the power line communication transmitter; where:

the processing unit is also configured to detect whether the voltage detected by the voltage detection unit is within a preset voltage range and send a detection result to the sending unit;

the sending unit is also configured to send an acknowledgment response message to the communication terminal if the detection result of the processing unit is yes, the acknowledgment response message including the identifier of the communication terminal and the identifier of the power line communication transmitter;

the processing unit is also configured to store the identifier of the communication terminal in the history matching record and store the matching state of the communication terminal as successfully-matched, when the detection result is yes.

According to yet another aspect of the present disclosure, there is provided a communication terminal including:

a switch provided between a power supply device and an inverter, configured to disconnect or connect a connection between the power supply device and the inverter;

a sending unit, configured to send a joining request message, the joining request message including an identifier of the communication terminal, a receiving unit, configured to receive a joining response message which is sent by a power line communication transmitter after determining that a matching state of the communication terminal being unmatched;

a verification unit, configured to verify the identifier of the communication terminal in the joining response message;

a processing unit, configured to store the identifier of the power line communication transmitter in the joining response message and control a switch of the communication terminal to turn on, when verification of the verification unit is passed; where:

the sending unit is further configured to send an acknowledgment request message to the power line communication transmitter;

the receiving unit is further configured to receive an acknowledgment response message which is sent by the power line communication transmitter after determining that a voltage on a power line between the communication terminal and the inverter corresponding to the power line communication transmitter is within a preset voltage range;

the verification unit is further configured to verify the identifier of the communication terminal and the identifier of the power line communication transmitter in the acknowledgment response message;

the receiving unit is further configured to store the identifier of the power line communication transmitter in a matching record of the communication terminal when verification for the acknowledgment response message is passed According to yet another aspect of the present disclosure, there is provided a system for crosstalk suppression of power line communication, including: the power line communication transmitter as described above and at least one communication terminal as described above;

where the at least one communication terminal is connected to the power line communication transmitter via two power lines, respectively.

The method for crosstalk suppression of power line communication, the apparatus and the system according to embodiments of the disclosure, include that: a PLC transmitter sends a joining response message after receiving a joining request message sent by a communication terminal, so that the PLC transmitter and the communication terminal obtain each other's identifier; then the communication terminal sends an acknowledgment request message to the PLC transmitter and turns on its switch; the PLC transmitter determines that the voltage on the power line between the communication terminal and an inverter corresponding to the PLC transmitter is within the preset voltage range, then the pairing of the communication terminal and the PLC transmitter is done, and the identifier of the other party and the matching state are stored, so that the communication terminal can verify the received action instruction subsequently so as to avoid the malfunction of the switch of the communication terminal during communication crosstalk.

BRIEF DESCRIPTION OF DRAWINGS

In order to illustrate the technical solutions of embodiments of the present disclosure more clearly, the drawings, which are intended to be used in the description of the embodiments, will be briefly described in the following. It will be apparent that the drawings in the following description are some embodiments of the present disclosure. Those skilled in the art will be able to obtain additional drawings in accordance with these drawings without paying creative effort.

DESCRIPTION OF EMBODIMENTS

In order to make the objectives, technical solutions and advantages of embodiments of the present disclosure more clear, the technical solutions in the embodiments of the present disclosure will be described in the following with reference to the accompanying drawings of the embodiments of the present disclosure in a clear and complete manner. Obviously, the described embodiments are part of the embodiments of the present disclosure, rather than all embodiments. The following embodiments and the features in the embodiments may be combined with each other as long as no conflict therebetween. All other embodiments obtained by those skilled in the art based on embodiments of the disclosure without making creative effort belong to the scope of the present disclosure.

The following embodiments illustrate the method for the crosstalk suppression of power line communication provided by the present disclosure by taking a photovoltaic power generation system as an example. Optionally, this method can also be applied to other PLC-based application scenarios such as meter copy systems, etc.

Figure 1:
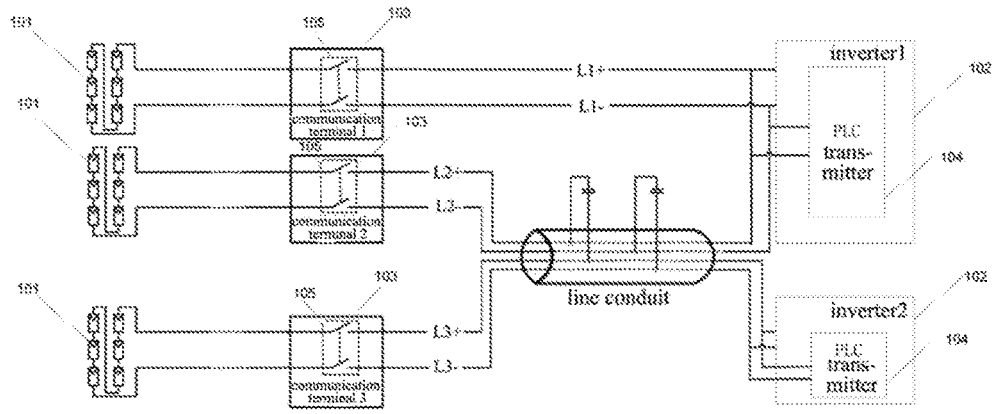
FIG. 1 is a schematic diagram of an application scenario of an existing method for crosstalk suppression of power line communication.

FIG. 1 is a schematic diagram of a photovoltaic power generation system. As shown in FIG. 1, the photovoltaic power generation system includes at least one photovoltaic panel 101, at least one inverter 102 and at least one communication terminal 103. Alternatively, one photovoltaic panel 101 may be connected with one inverter 102, or a plurality of photovoltaic panels 101 may be connected with one inverter 102. The photovoltaic panel 101 is connected to the inverter 102 through a power line to realize power line communication (PLC). The photovoltaic panel 101 supplies power to the load through the inverter 102. A communication terminal 103 is provided between each photovoltaic panel and the inverter 102, where the communication terminal 103 includes a switch 105. However, when a sudden abnormality event happens, such as a fire on the inverter 102 side, the switch 105 of the communication terminal 103 can be turned off to disconnect the inverter 102 from the photovoltaic panel 101 with high voltage and high energy. In this embodiment, FIG. 1 only shows the connection relationships in an illustrative manner, but it isn't limited to this. Other functional units such as a processing unit, a transceiver unit may also be included in the communication terminal 103.

A power line communication transmitter 104 (PLC transmitter) can be provided on the inverter 102 without the addition of an extra line. The PLC transmitter 104 is connected to the communication terminal 103 through the power line, and the communication terminal 103 functions as a power line communication receiver. The PLC transmitter 104 sends an action instruction, such as a turn-off instruction, to the communication terminal 103 via the power line. The communication terminal 103 receives the action instruction and then the switch 105 is turned off according to the action instruction to disconnect the electrical connection between the photovoltaic panel 101 and the inverter 102.

As shown in FIG. 1, an installation manner that multiple power lines are introduced in one line conduit can be used to simplify the field wiring. The coupling capacitor formed between different power lines will provide a wrong transmission path for PLC high frequency communication signals, thereby resulting in signal crosstalk between different devices. The action instruction sent by an inverter 102 will be received simultaneously by the communication terminal 103 connected with other inverter 102, thereby triggering the malfunction of the switch 105 of the communication terminal 103.

In order to solve the above problem, the present disclosure provides a method for crosstalk suppression of power line communication (PLC), which will be described in detail with reference to specific embodiments.

Figure 2:
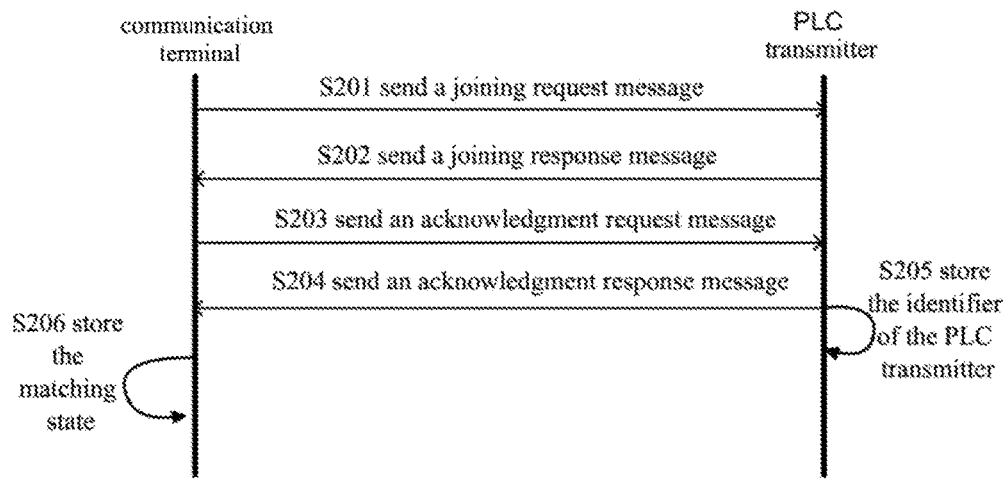
FIG. 2 is a schematic flow diagram of a method for crosstalk suppression of power line communication provided by the first embodiment of the present disclosure.

FIG. 2 is a schematic flow diagram of a method for crosstalk suppression of power line communication provided by the first embodiment of the present disclosure. This method can be applied to PLC-based application scenarios, such as photovoltaic power generation system shown in FIG. 1. As shown in FIG. 2, the method includes:

S201, send a joining request message.

Specifically, the communication terminal sends the joining request message, the joining request message including an identifier of the communication terminal. In more details, the communication terminal sends the joining request message carrying its own identifier to the PLC transmitter connected to the communication terminal via a power line. In one embodiment, the identifier may be a device identification of the communication terminal.

S202, send a joining response message.

Specifically, the PLC transmitter receives the joining request message and judges a matching state of the communication terminal according to the history matching record and the identifier of the communication terminal in the joining request message. If determining that the matching state is unmatched, the PLC transmitter sends the joining response message to the communication terminal. The joining response message includes the identifier of the communication terminal and an identifier of the PLC transmitter.

In one embodiment, the PLC transmitter looks for the matching state of the communication terminal in the pre-stored history matching record according to the identifier of the communication terminal. If this identifier does not exist in the history matching record, the matching state corresponding to this identifier is regarded as unmatched, and then the joining response message is sent to the communication terminal. If the matching state corresponding to this identifier exists in the history matching record and is unmatched, then the joining response message is sent to the communication terminal.

S203, send an acknowledgment request message.

Specifically, the communication terminal receives the joining response message which is sent by the PLC transmitter, and verifies the identifier of the communication terminal in the joining response message. If the verification is passed, the communication terminal stores the identifier of the PLC transmitter in the joining response message, and turns on the switch of the communication terminal; and then sends the acknowledgment request message to the PLC transmitter.

S204, send an acknowledgment response message.

Specifically, the PLC transmitter receives the acknowledgment request message which is sent by the communication terminal. Then detect a voltage on the power line between the communication terminal and an inverter corresponding to the PLC transmitter, for example, the DC side of an inverter corresponding to the PLC transmitter. If it is determined that the said voltage is within the preset voltage range, then the acknowledgment response message is sent to the communication terminal. The acknowledgment response message includes the identifier of the communication terminal and the identifier of the PLC transmitter.

S205, store the matching state.

Specifically, the PLC transmitter stores the identifier of the communication terminal of the acknowledgment response message in the history matching record after sending the acknowledgment response message to the communication terminal. Then, the PLC transmitter stores the matching state as successfully-matched or the matching state in the history matching record is changed from unmatched to successfully-matched.

S206, store the identifier of the PLC transmitter.

Specifically, the communication terminal receives the acknowledgment response message which is sent by the PLC transmitter, and verifies the identifier of the communication terminal and the identifier of the PLC transmitter in the acknowledgment response message; if the verification is passed, the identifier of the PLC transmitter in the acknowledgment response message is stored in the matching record of the communication terminal.

By employing the aforementioned pairing method, the matching record of the communication terminal stores the identifier of the PLC transmitter corresponding to the inverter which is connected to this communication terminal. When the communication terminal receives the action instruction of the communication terminal again, the communication terminal can verify whether the identifier of the PLC transmitter carried in the action instruction coincides with the identifier in the matching record of the communication terminal, and when they are consistent, the action instruction is executed, and when they are not consistent, the action instruction is considered to be communication crosstalk and may not be executed.

The aforementioned pairing method for the PLC transmitter and the communication terminal can suppress crosstalk of power line communication, thereby preventing the PLC transmitter from triggering the malfunction of the switch 105 of the communication terminal 103.

In one embodiment, before performing the method for crosstalk suppression of power line communication provided by the present disclosure, the switches of all the communication terminals are turned off, and the switches of the communication terminals are all turned on after finishing the pairing between the PLC transmitters and the communication terminals.

In one embodiment, in order to avoid the problem of PLC crosstalk, action instructions sent by the PLC transmitter can carry the identifiers of the communication terminal, so that the communication terminal can verify whether this action instruction received is sent by the PLC transmitter which is connected with this communication terminal.

Figure 3:
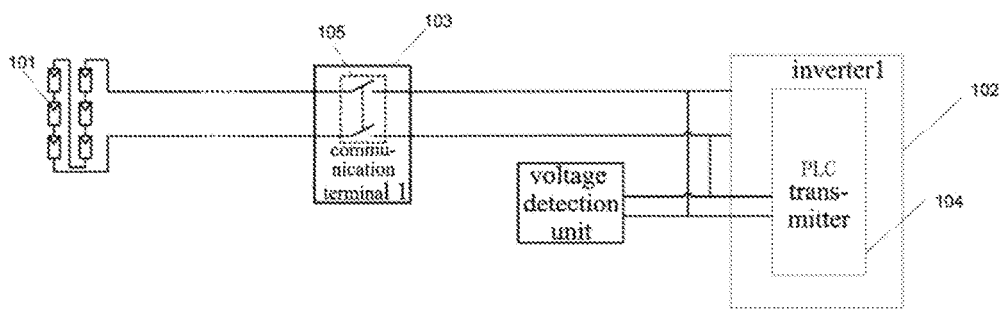
FIG. 3 is a schematic diagram of an application scenario of a method for crosstalk suppression of power line communication provided by the present disclosure.

In one embodiment, a voltage detection unit may be provided to detect the voltage on the power line between the communication terminal and an inverter corresponding to the PLC transmitter, e.g. the DC side of the inverter. As shown in FIG. 3, a voltage detection unit is provided near the inverter and detects the voltage on power line of the inverter 102, wherein the power line is two power lines between the communication terminal 103 and the inverter 102. In step S204, the communication terminal turns on the switch thereof. Since the switches of the remaining communication terminals are turned off at this time, if the voltage on DC side of the inverter is within the preset voltage range, the PLC transmitter corresponding to this inverter is a pairing transmitter for this communication terminal.

Referring to FIGS. 1 and 2 again, the photovoltaic power generation system includes three photovoltaic panels, three communication terminals and two inverters. The communication terminal 1 is connected to the inverter 1 using the power lines L1+ and L1−, the communication terminal 2 is connected to the inverter 1 using the power lines L2+ and L2−, the communication terminal 3 is connected to the inverter 2 using the power lines L3+ and L3−, and the power lines L2+ and L2−, L3+ and L3− are disposed in the same line conduit.

When the crosstalk occurs when the communication terminal sends the joining request message, for example, the joining request message of the communication terminal 2 is sent to the PLC transmitter 2 in the inverter 2, then the PLC transmitter 2 sends the joining response message to the communication terminal 2. If no crosstalk occurs during the process of sending the joining response message, the sending will fail because the PLC transmitter 2 and the communication terminal 2 are not connected via power lines. If the crosstalk occurs again during the process of sending the joining response message, communication terminal 2 receives and verifies the joining response message, and the verification is successful, the communication terminal 2 controls the switch of the communication terminal 2 to turn on and then sends the acknowledgment request message to the PLC transmitter 2 in the inverter 2. If no crosstalk occurs during the process of sending the acknowledgment request message, the PLC transmitter 1 in the inverter 1 receives the acknowledgment request message from the communication terminal 2 but the verification at the PLC transmitter 1 cannot be passed. If the crosstalk occurs during the process of sending the acknowledgment request message, the PLC transmitter 2 in the inverter 2 receives the acknowledgment request message and the verification is successful, but the voltage on the DC side of the inverter 2 will be further checked by the PLC transmitter 2 in the inverter 2. Although the switch of the communication terminal 2 has been turned on, the turning on of the switch of the communication terminal 2 allows the photovoltaic panel 101 to be connected to only the inverter 1 since the communication terminal 2 and the inverter 2 are not connected via a power line. And the photovoltaic panel 101 can only be connected to the inverter 2 by turning on the switch of the communication terminal 3. However, the switch of the communication terminal 3 is turned off, thus the inverter 2 cannot receive the power from the photovoltaic panels 101 and the voltage on the DC side of the inverter 2 is low and is not within the preset voltage range, so that the communication terminal 2 and the inverter 2 cannot be successfully matched, thereby avoiding crosstalk.

In one embodiment, if the voltage on DC side of the inverter is not within the preset voltage range in step S204, which indicates that the communication terminal is not the one that connected with this PLC transmitter, then the identifier of the communication terminal can be stored in the history matching record and the matching state is stored as matching-failed.

In one embodiment, in step S202, when the PLC transmitter determines the matching state corresponding to the identifier to be matching-failed according to the identifier in the received joining request message, then the pairing process of the PLC transmitter and the communication terminal is immediately stopped.

In one embodiment, in step S204, after the PLC transmitter receives the acknowledgment request message which is sent after the switch of the communication terminal is turned on, the method further includes:

sending a turn-off instruction to the first communication terminal according to the history matching record, so that the switch of the first communication terminal is turned off according to the turn-off instruction;

where the first communication terminal is a communication terminal whose matching state in the history matching record is successfully-matched.

In one embodiment, in step 204, when the PLC transmitter receives the acknowledgment request message sent by the communication terminal, the switch of this communication terminal which sends the acknowledge request message is turned on. For avoiding matching error between the communication terminal and the PLC transmitter, the switches of the other communication terminals must be controlled to turn off. Thereby, the PLC transmitter denotes the communication terminals as the first communication terminals, whose matching state in the history matching record have been successfully-matched. Then the PLC transmitter sends an action instruction, e.g. a turn-off instruction, to the first communication terminals, so that the switches of the first communication terminals are turned off according to the turn-off instruction.

In one embodiment, after the acknowledgment response message sent by the PLC transmitter is received in S206, the method also includes controlling the switch of this communication terminal to turn off, for the convenience that other communication terminals do the matching with the PLC transmitter. Or the communication terminal verifies that the received joining response message is correct in S203, then the switch of the communication terminal is turned on, and after a predetermined period of time, the switch of the communication terminal is directly turned off.

Figure 4:
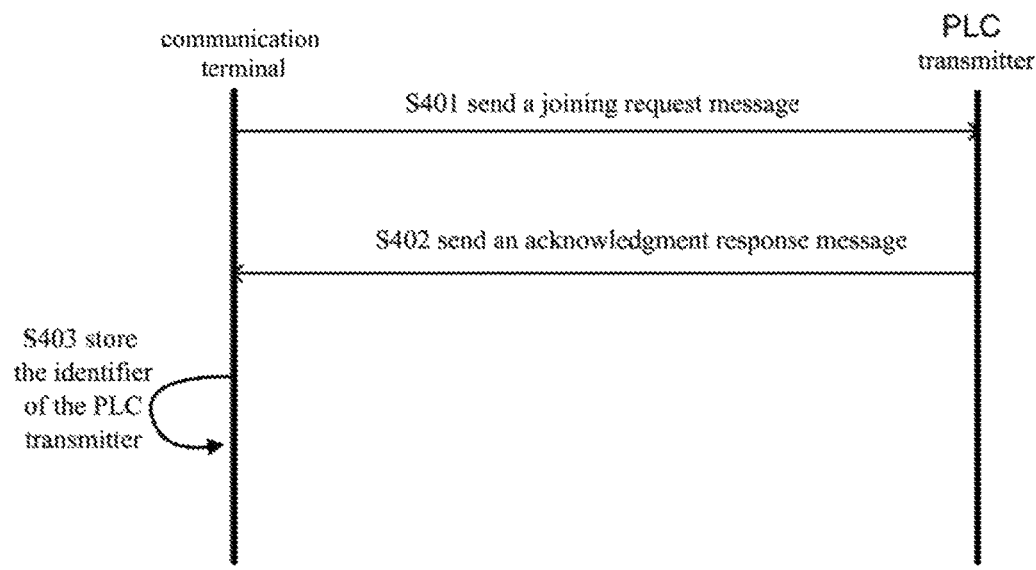
FIG. 4 is a schematic flow diagram of a method for crosstalk suppression of power line communication provided by the second embodiment of the present disclosure.

FIG. 4 is a schematic flow diagram of a method for crosstalk suppression of power line communication provided by the second embodiment of the present disclosure. The method shown in FIG. 4 is a supplementary method to the FIG. 3. As shown in FIG. 4, the method for the crosstalk suppression of power line communication provided by the present disclosure includes:

S401, send a joining request message.

Specifically, the communication terminal sends the joining request message to the PLC transmitter, the joining request message including an identifier of the communication terminal. In one embodiment, the identifier may be a device identification of the communication terminal.

S402, send an acknowledgment response message.

Specifically, the PLC transmitter receives the joining request message and judges a matching state of the communication terminal according to the history matching record and the identifier of the communication terminal in the joining request message. If determining that the matching state of the communication terminal is successfully-matched, the PLC transmitter sends the acknowledgment response message to the communication terminal. The acknowledgment response message includes the identifier of the communication terminal in the joining request message and the identifier of the PLC transmitter.

S403, store the identifier of the PLC transmitter.

Specifically, the communication terminal receives the acknowledgment response message which is sent by the PLC transmitter after determining the matching state of the communication terminal to be successfully-matched, and verifies the identifier of the communication terminal in the acknowledgment response message. If the verification is passed, the identifier of the PLC transmitter in the acknowledgment response message is stored in the matching record of the communication terminal.

As shown in FIG. 4, when the PLC transmitter determines the matching state of the communication terminal to be successfully-matched according to the history matching record and the identifier of the communication terminal, it can be known that this communication terminal used to be successfully matched with this PLC transmitter. Considering that the connection lines of practical photovoltaic systems rarely change, then it can be confirmed that this communication terminal is paired with this PLC transmitter, and the acknowledgment response message can be directly sent to this communication terminal. After receiving the acknowledgment response message, this communication terminal verifies the identifier of the communication terminal in the acknowledgment response message, and if the verification is passed, stores the identifier of this PLC transmitter in the matching record of the communication terminal. Thereby, this communication terminal can be controlled by the action instruction sent by this PLC transmitter, and considers the action instruction sent by other PLC transmitter as a communication crosstalk.

Figure 5:
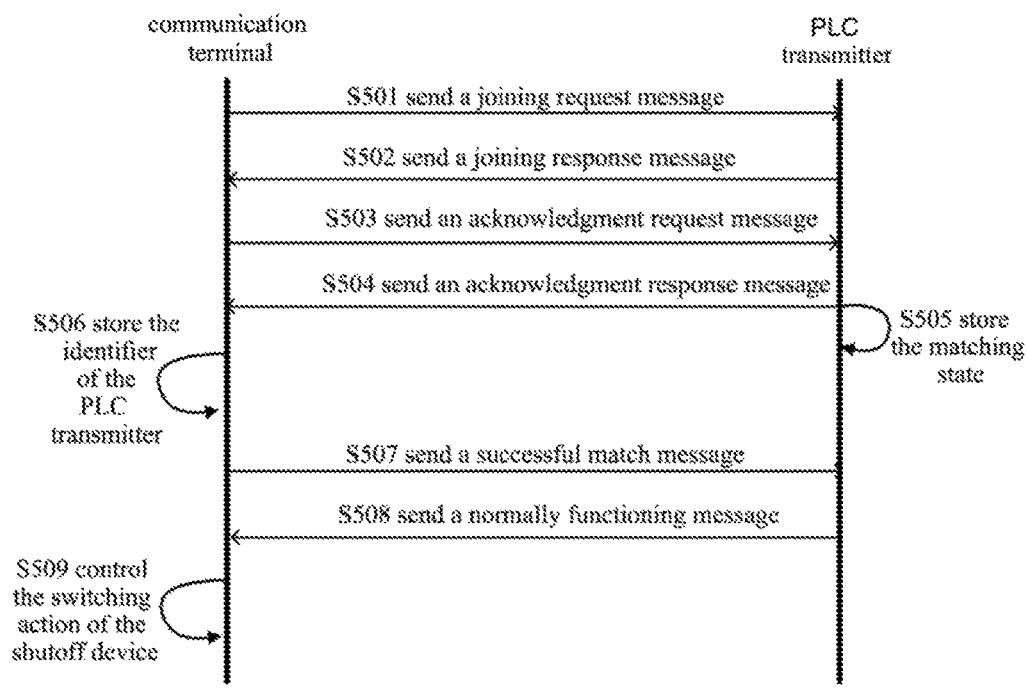
FIG. 5 is a schematic flow diagram of a method for crosstalk suppression of power line communication provided by the third embodiment of the present disclosure.

FIG. 5 is a schematic flow diagram of a method for crosstalk suppression of power line communication provided by the third embodiment of the present disclosure. The method shown in FIG. 5 is a supplementary method to the FIG. 3 or FIG. 4. As shown in FIG. 5, the method for the crosstalk suppression of power line communication provided by the present disclosure, includes:

S501, send a joining request message.

S502, send a joining response message.

S503, send an acknowledgment request message.

S504, send an acknowledgment response message.

S505, store the matching state.

S506, store the identifier of the PLC transmitter.

S507, send a successful match message.

Specifically, the communication terminal sends the successful match message to the PLC transmitter, in which the successful match message includes the identifier of the communication terminal and the identifier of the PLC transmitter.

S508, send a normally functioning message.

Specifically, the PLC transmitter receives the successful match message which is sent by the communication terminal, and verifies the identifier of the communication terminal and the identifier of the PLC transmitter in the successful match message; if the verification is passed, the normally functioning message, e.g. an action instruction, is sent to all the communication terminals whose matching state stored in the history matching record is successfully-matched, in which the normally functioning message includes the identifier of each communication terminal and the identifier of the PLC transmitter.

S509, control the switching action of the communication terminal.

Specifically, the communication terminal receives the normally functioning message which is sent by the PLC transmitter, and verifies whether the identifier of the PLC transmitter in the normally functioning message coincides with the identifier of the PLC transmitter in the matching record of the communication terminal. If they are consistent, then the switching action of the communication terminal is controlled according to the normally functioning message. And if they are not consistent, then the normally functioning message is considered to be communication crosstalk and may not be executed.

In one embodiment, the normally functioning message includes an action instruction of the communication terminal which can be a turn-on instruction or a turn-off instruction.

In one embodiment, S501 to S506 may be the same as S201 to S206 shown in FIG. 2; In other embodiment, S501 to S506 may be replaced by S401 to S403 in FIG. 4.

According to another aspect of the present disclosure, there is provided a power line communication transmitter and a communication terminal, for performing the method for crosstalk suppression of power line communication in the above-described embodiments, and the power line communication transmitter and the communication terminal have the same technical features and technical effects with the method for crosstalk suppression of power line communication, which will not be repeated in the present disclosure.

Figure 6:
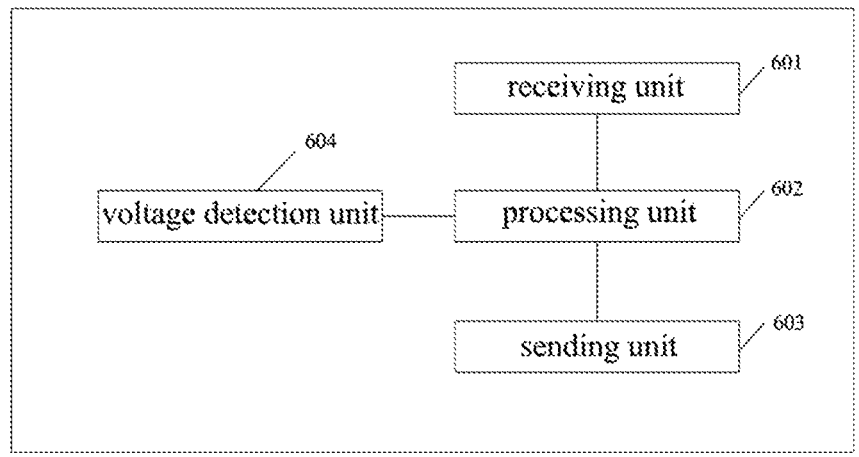
FIG. 6 is a schematic structural view of a power line communication transmitter provided by the first embodiment of the present disclosure.

FIG. 6 is a schematic structural view of a power line communication transmitter provided by the first embodiment of the present disclosure. As shown in FIG. 6, the power line communication transmitter includes:

a receiving unit 601, configured to receive a joining request message, the joining request message including the identifier of the communication terminal;

a processing unit 602, configured to determine the matching state of the communication terminal according to the history matching record and the identifier of the communication terminal in the joining request message;

a sending unit 603, configured to send a joining response message to the communication terminal when the processing unit 602 determines the matching state of the communication terminal to be unmatched, the joining response message including the identifier of the communication terminal in the joining request message and the identifier of the power line communication transmitter;

the receiving unit 601 is also configured to receive an acknowledgment request message which is sent by the communication terminal after the switch thereof is turned on;

a voltage detection unit 604, configured to detect the voltage on the power line between the communication terminal and an inverter corresponding to the power line communication transmitter;

the processing unit 602 is also configured to detect whether the voltage detected by the voltage detection unit 604 is within a preset voltage range and send the detection result to the sending unit 603;

the sending unit 603 is also configured to send an acknowledgment response message to the communication terminal if the detection result of the processing unit 602 is yes, the acknowledgment response message including the identifier of the communication terminal and the identifier of the power line communication transmitter;

the processing unit 602 is also configured to store the identifier of the communication terminal in the history matching record and store the matching state of the communication terminal as successfully-matched, when the detection result is yes.

Alternatively, the sending unit 603 is further configured to send the acknowledgment response message to the communication terminal when the processing unit 602 determines the matching state of the communication terminal to be successfully-matched, the acknowledgment response message including the identifier of the communication terminal and the identifier of the power line communication transmitter.

Figure 7:
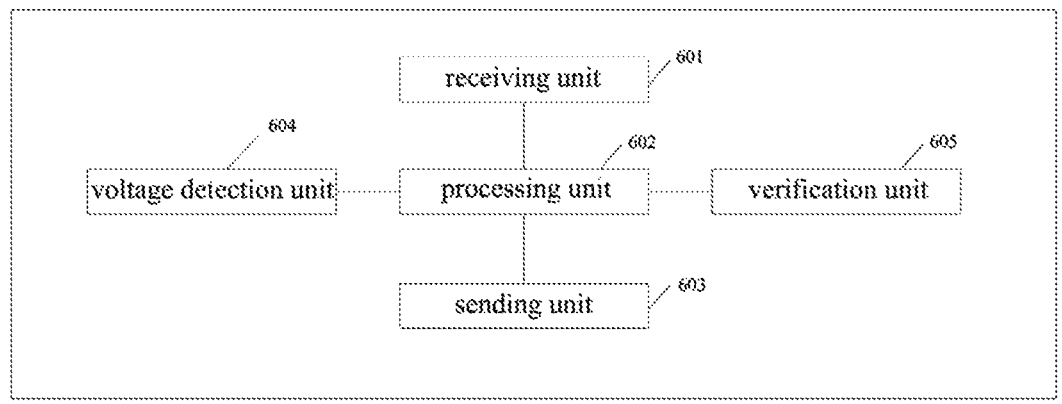
FIG. 7 is a schematic structural view of a power line communication transmitter provided by the second embodiment of the present disclosure.

On basis of any of the above embodiments, FIG. 7 is a schematic structural view of a power line communication transmitter provided by the second embodiment of the present disclosure. As shown in FIG. 7, the receiving unit 601 is also configured to receive a successful match message which is sent by the communication terminal after storing the identifier of the power line communication transmitter in the matching record;

the power line communication transmitter also includes a verification unit 605 configured to verify the identifier of the communication terminal and the identifier of the power line communication transmitter in the successful match message;

the sending unit 603 is also configured to send, if the verification is passed, a normally functioning message to all the communication terminals whose matching state stored in the history matching record is successfully-matched, the normally functioning message including the identifier of each communication terminal and the identifier of the power line communication transmitter.

Alternatively, the sending unit 603 is further configured to send a turn-off instruction to the first communication terminal according to the history matching record after receiving the acknowledgment request message which is sent by the communication terminal after the switch thereof is turned on, so that the switch of the first communication terminal is turned off according to the turn-off instruction;

where the first communication terminal is a communication terminal whose matching state in the history matching record is successfully-matched.

Alternatively, the processing unit 602 is also configured to store the identifier of the communication terminal in the history matching record and store the matching state of the communication terminal as matching-failed, when the detection result of the processing unit 602 is no.

Figure 8:
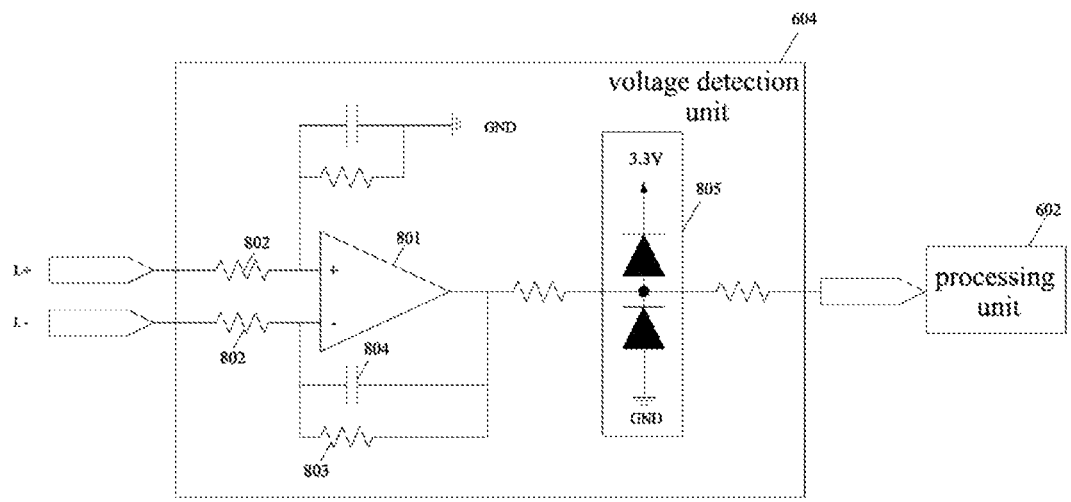
FIG. 8 is a schematic structural view of a voltage detection unit provided by an embodiment of the present disclosure.

On basis of any of the above embodiments, FIG. 8 is a schematic structural view of a voltage detection unit provided by an embodiment of the present disclosure. As shown in FIG. 8, the voltage detection unit 604 includes an operational amplifier 801, two first resistors 802, a second resistor 803, a first capacitor 804, a voltage stabilizing circuit 805;

The non-inverting input and the inverting input of the operational amplifier 801 is connected to the power line between the communication terminal and the inverter corresponding to the power line communication transmitter via one first resistor 802, the inverting input of the operational amplifier 801 is also connected to the output of the operational amplifier 801 via the second resistor 803 and the first capacitor 804 which are connected in parallel, and the output of the operational amplifier 801 is also connected to the processing unit 602 via the voltage stabilizing circuit 805.

Specifically, the voltage detection unit 604 includes the operational amplifier 801. The first resistors 802 provided at both the non-inverting input and the inverting input of the operational amplifier 801 function symmetrically. There also provided the second resistor 803 and the first capacitor 804 which are connected in parallel between the inverting input and the output of the operational amplifier 801, where the resistance of the first resistor 802 and the second resistor 803 determines the amplification ratio of the operational amplifier 801, and the amplification ratio in the present embodiment may be smaller than 1. The first capacitor 804 functions as a filter, and the voltage stabilizing circuit 805 serves to prevent the voltage outputted by the voltage detection unit 604 from being excessively high.

As shown in FIG. 8, the non-inverting input of the operational amplifier 801 is also connected with a filter circuit, the filter circuit including a resistor and a capacitor connected in parallel. The output of the operational amplifier 801 and the output of the voltage stabilizing circuit 805 are also provided with resistors for limiting the current.

Figure 9:
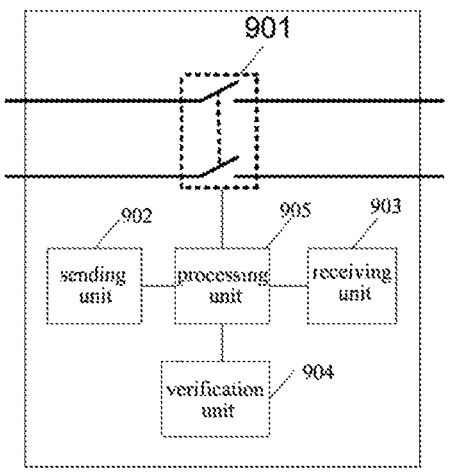
FIG. 9 is a schematic structural view of a communication terminal provided by the first embodiment of the present disclosure.

FIG. 9 is a schematic structural view of a communication terminal provided by the first embodiment of the present disclosure. As shown in FIG. 9, the communication terminal includes:

a switch 901 provided between a power supply device and an inverter, configured to disconnect or connect the connection between the power supply device and the inverter;

a sending unit 902, configured to send a joining request message, the joining request message including the identifier of the communication terminal;

a receiving unit 903, configured to receive a joining response message which is sent by the power line communication transmitter after determining the matching state of the communication terminal to be unmatched;

a verification unit 904, configured to verify the identifier of the communication terminal in the joining response message;

a processing unit 905, configured to store the identifier of the power line communication transmitter in the joining response message and control the switch 901 of the communication terminal to turn on when the verification of the verification unit 904 is passed;

the sending unit 902 is further configured to send an acknowledgment request message to the power line communication transmitter;

the receiving unit 903 is further configured to receive the acknowledgment response message which is sent by the power line communication transmitter after determining that the voltage on the power line between the communication terminal and the inverter corresponding to the power line communication transmitter is within the preset voltage range;

the verification unit 904 is also configured to verify the identifier of the communication terminal and the identifier of the power line communication transmitter in the acknowledgment response message;

the receiving unit 903 is further configured to store the identifier of the power line communication transmitter in the matching record of the communication terminal when the verification for the acknowledgment response message is passed.

Optionally, the sending unit 902 is further configured to send a successful match message to the power line communication transmitter, the successful match message including the identifier of the communication terminal and the identifier of the power line communication transmitter;

the receiving unit 903 is further configured to receive a normally functioning message which is sent by the power line communication transmitter after verifying the successful match message;

the verification unit 904 is also configured to verify the identifier of the communication terminal in the normally functioning message, and determine whether the identifier of the power line communication transmitter in the normally functioning message coincides with the identifier of the power line communication transmitter in the matching record;

the processing unit 905 is also configured to control the action of the switch 901 in the communication terminal according to the normally functioning message when the identifier of the power line communication transmitter in the normally functioning message coincides with the identifier of the power line communication transmitter in the matching record.

Optionally, the receiving unit 903 is further configured to receive the acknowledgment response message which is sent by the power line communication transmitter after determining the matching state of the communication terminal to be successfully-matched;

the verification unit 904 is also configured to verify the identifier of the communication terminal in the acknowledgment response message;

the processing unit 905 is also configured to store the identifier of the power line communication transmitter in the matching record of the communication terminal and control the action of the switch 901, when the verification is passed.

The embodiments of the present disclosure also provides a system for crosstalk suppression of power line communication including the power line communication transmitter as described in any one of the above embodiments and at least one communication terminal as described in any one of the above embodiments. The at least one communication terminals is connected to the power line communication transmitter via two power lines, respectively.

Finally, it should be noted that the above embodiments are merely illustrative of the technical solutions of the present disclosure and are not intended to be limited. While the disclosure has been described in detail with reference to the foregoing embodiments, it will be understood by those skilled in the art that it is still possible to modify the technical solutions described in the foregoing embodiments or to equivalently substitute some or all of the technical features therein, and these modifications or substitutions do not make the essence of corresponding technical solutions depart from the scope of the technical solutions of the embodiments of the present disclosure.

What is claimed is:

1. A method for crosstalk suppression of power line communication, applied to a power line communication transmitter, comprising:

receiving a joining request message, the joining request message comprising an identifier of a communication terminal;

judging a matching state of the communication terminal in accordance with a history matching record and the identifier of the communication terminal, and if the matching state of the communication terminal is unmatched:

sending a joining response message to the communication terminal, the joining response message comprising the identifier of the communication terminal and an identifier of the power line communication transmitter;

receiving an acknowledgment request message which is sent by the communication terminal after a switch of the communication terminal is turned on;

detecting a voltage on a power line between the communication terminal and an inverter corresponding to the power line communication transmitter; if the voltage is within a preset voltage range, sending an acknowledgment response message to the communication terminal, the acknowledgment response message comprising the identifier of the communication terminal and the identifier of the power line communication transmitter; and storing the identifier of the communication terminal in the history matching record and storing the matching state of the communication terminal as successfully-matched.

2. The method according to claim 1, further comprising, if the matching state of the communication terminal is successfully-matched upon the judging the matching state of the communication terminal:

sending an acknowledgment response message to the communication terminal, the acknowledgment response message comprising the identifier of the communication terminal and the identifier of the power line communication transmitter.

3. The method according to claim 1, wherein after the storing the identifier of the communication terminal in the history matching record and storing the matching state of the communication terminal as successfully-matched, the method further comprises:

receiving a successful match message which is sent by the communication terminal after storing the identifier of the power line communication transmitter in a matching record of the communication terminal, verifying the identifier of the communication terminal and the identifier of the power line communication transmitter in the successful match message;

if verification is passed, sending a normally functioning message to all the communication terminals whose matching state stored in the history matching record is successfully-matched, the normally functioning message comprising the identifier of each of the communication terminals and the identifier of the power line communication transmitter.

4. The method according to claim 1, wherein after the receiving the acknowledgment request message which is sent by the communication terminal after the switch of the communication terminal is turned on, the method further comprises:

sending a turn-off instruction to a first communication terminal in accordance with the history matching record, so that a switch of the first communication terminal is turned off in accordance with the turn-off instruction;

wherein the first communication terminal is a communication terminal whose matching state in the history matching record is successfully-matched.

5. The method according to claim 1, further comprising, if the voltage on the power line between the communication terminal and the inverter corresponding to the power line communication transmitter is not within the preset voltage range upon the detecting the voltage on the power line, storing the identifier of the communication terminal in the history matching record and storing the matching state of the communication terminal as matching-failed.

6. A method for crosstalk suppression of power line communication, applied to a communication terminal, comprising:

sending a joining request message, the joining request message comprising an identifier of the communication terminal;

receiving a joining response message which is sent by a power line communication transmitter after determining a matching state of the communication terminal being unmatched, verifying the identifier of the communication terminal in the joining response message, and if verification is passed, storing the identifier of the power line communication transmitter in the joining response message and turning on a switch of the communication terminal;

sending an acknowledgment request message to the power line communication transmitter;

receiving an acknowledgment response message which is sent by the power line communication transmitter after determining that a voltage on a power line between the communication terminal and an inverter corresponding to the power line communication transmitter is within a preset voltage range;

verifying the identifier of the communication terminal and the identifier of the power line communication transmitter in the acknowledgment response message; and if verification is passed, storing the identifier of the power line communication transmitter in a matching record of the communication terminal.

7. The method according to claim 6, wherein after the receiving the acknowledgment response message which is sent by the power line communication transmitter after determining that the voltage on the power line between the communication terminal and the inverter corresponding to the power line communication transmitter is within a preset voltage range, the method further comprises:

sending a successful match message to the power line communication transmitter, the successful match message comprising the identifier of the communication terminal and the identifier of the power line communication transmitter;

receiving a normally functioning message which is sent by the power line communication transmitter after verifying the successful match message;

verifying the identifier of the communication terminal in the normally functioning message, and verifying whether the identifier of the power line communication transmitter in the normally functioning message coincides with the identifier of the power line communication transmitter in the matching record;

if the identifier of the power line communication transmitter in the normally functioning message coincides with the identifier of the power line communication transmitter in the matching record, controlling a switching action of the communication terminal according to the normally functioning message.

8. The method according to claim 6, further comprising:

receiving the acknowledgment response message which is sent by the power line communication transmitter after determining the matching state of the communication terminal being successfully-matched, verifying the identifier of the communication terminal in the acknowledgment response message, and if verification is passed, storing the identifier of the power line communication transmitter in the matching record of the communication terminal and controlling a switching action of the communication terminal.

9. A power line communication transmitter, comprising:

a receiving unit, configured to receive a joining request message, the joining request message comprising an identifier of a communication terminal;

a processing unit, configured to determine a matching state of the communication terminal according to a history matching record and the identifier of the communication terminal;

a sending unit, configured to send a joining response message to the communication terminal when the processing unit determines that the matching state of the communication terminal is unmatched, the joining response message comprising the identifier of the communication terminal and an identifier of the power line communication transmitter;

wherein the receiving unit is further configured to receive an acknowledgment request message which is sent by the communication terminal after a switch of the communication terminal is turned on;

a voltage detection unit, configured to detect a voltage on a power line between the communication terminal and an inverter corresponding to the power line communication transmitter; wherein:

the processing unit is further configured to detect whether the voltage detected by the voltage detection unit is within a preset voltage range and send a detection result to the sending unit;

the sending unit is further configured to send an acknowledgment response message to the communication terminal if the detection result of the processing unit is yes, the acknowledgment response message comprising the identifier of the communication terminal and the identifier of the power line communication transmitter;

the processing unit is further configured to store the identifier of the communication terminal in the history matching record and store the matching state of the communication terminal as successfully-matched, when the detection result is yes.

10. The power line communication transmitter according to claim 9, wherein the sending unit is further configured to send the acknowledgment response message to the communication terminal when the processing unit determines the matching state of the communication terminal to be successfully-matched, the acknowledgment response message comprising the identifier of the communication terminal and the identifier of the power line communication transmitter.

11. The power line communication transmitter according to claim 9, wherein the receiving unit is further configured to receive a successful match message which is sent by the communication terminal after storing the identifier of the power line communication transmitter in a matching record of the communication terminal; the power line communication transmitter further comprises:
    a verification unit, configured to verify the identifier of the communication terminal and the identifier of the power line communication transmitter in the successful match message;
    wherein the sending unit is further configured to send, if verification is passed, a normally functioning message to all the communication terminals whose matching state stored in the history matching record is successfully-matched, the normally functioning message comprising the identifier of each of the communication terminals and the identifier of the power line communication transmitter.

12. The power line communication transmitter according to claim 9, wherein the sending unit is further configured to,
    after the receiving the acknowledgment request message which is sent by the communication terminal after the switch of the communication terminal is turned on, send a turn-off instruction to a first communication terminal according to the history matching record, so that a switch of the first communication terminal is turned off according to the turn-off instruction;
    wherein the first communication terminal is a communication terminal whose matching state in the history matching record is successfully-matched.

13. The power line communication transmitter according to claim 9, wherein the processing unit is further configured to, when the detection result of the processing unit is no, store identifier of the communication terminal in the history matching record, and store the matching state of the communication terminal as matching-failed.

14. The power line communication transmitter according to claim 9, wherein the voltage detection unit comprises: an operational amplifier, two first resistors, a second resistor, a first capacitor, a voltage stabilizing circuit;
    wherein each of a non-inverting input and an inverting input of the operational amplifier is connected to the power line between the communication terminal and the inverter corresponding to the power line communication transmitter via one of the first resistors, the inverting input of the operational amplifier is also connected to an output of the operational amplifier via the second resistor and the first capacitor which are connected in parallel, and the output of the operational amplifier is also connected to the processing unit via the voltage stabilizing circuit.

15. A communication terminal, comprising:
    a switch provided between a power supply device and an inverter, configured to disconnect or connect a connection between the power supply device and the inverter;
    a sending unit, configured to send a joining request message, the joining request message comprising an identifier of the communication terminal;
    a receiving unit, configured to receive a joining response message which is sent by a power line communication transmitter after determining a matching state of the communication terminal being unmatched;
    a verification unit, configured to verify the identifier of the communication terminal in the joining response message;
    a processing unit, configured to store the identifier of the power line communication transmitter in the joining response message and control a switch of the communication terminal to turn on, when verification of the verification unit is passed; wherein:
    the sending unit is further configured to send an acknowledgment request message to the power line communication transmitter;
    the receiving unit is further configured to receive an acknowledgment response message which is sent by the power line communication transmitter after determining that a voltage on a power line between the communication terminal and the inverter corresponding to the power line communication transmitter is within a preset voltage range;
    the verification unit is further configured to verify the identifier of the communication terminal and the identifier of the power line communication transmitter in the acknowledgment response message;
    the receiving unit is further configured to store the identifier of the power line communication transmitter in a matching record of the communication terminal when verification for the acknowledgment response message is passed.

16. The communication terminal according to claim 15, wherein the sending unit is further configured to send a successful match message to the power line communication transmitter, the successful match message comprising the identifier of the communication terminal and the identifier of the power line communication transmitter;
    the receiving unit is further configured to receive a normally functioning message which is sent by the power line communication transmitter after verifying the successful match message;
    the verification unit is further configured to verify the identifier of the communication terminal in the normally functioning message, and determine whether the identifier of the power line communication transmitter in the normally functioning message coincides with the identifier of the power line communication transmitter in the matching record;
    the processing unit is further configured to control a switching action of the communication terminal according to the normally functioning message when the identifier of the power line communication transmitter in the normally functioning message coincides with the identifier of the power line communication transmitter in the matching record.

17. The communication terminal according to claim 15, wherein,
    the receiving unit is further configured to receive the acknowledgment response message which is sent by the power line communication transmitter after determining the matching state of the communication terminal being successfully-matched;

the verification unit is further configured to verify the identifier of the communication terminal in the acknowledgment response message;

the processing unit is further configured to store the identifier of the power line communication transmitter in the matching record of the communication terminal and control a switching action of the communication terminal, when verification is passed.

18. A system for crosstalk suppression of power line communication, comprising: a power line communication transmitter and at least one communication terminal; wherein the at least one communication terminal is connected to the power line communication transmitter via two power lines, respectively;

wherein the power line communication transmitter, comprising:

a first receiving unit, configured to receive a joining request message, the joining request message comprising an identifier of the communication terminal;

a first processing unit, configured to determine a matching state of the communication terminal according to a history matching record and the identifier of the communication terminal;

a first sending unit, configured to send a joining response message to the communication terminal when the first processing unit determines that the matching state of the communication terminal is unmatched, the joining response message comprising the identifier of the communication terminal and an identifier of the power line communication transmitter;

wherein the first receiving unit is further configured to receive an acknowledgment request message which is sent by the communication terminal after a switch of the communication terminal is turned on;

a voltage detection unit, configured to detect a voltage on a power line between the communication terminal and an inverter corresponding to the power line communication transmitter, wherein:

the first processing unit is further configured to detect whether the voltage detected by the voltage detection unit is within a preset voltage range and send a detection result to the first sending unit;

the first sending unit is further configured to send an acknowledgment response message to the communication terminal if the detection result of the first processing unit is yes, the acknowledgment response message comprising the identifier of the communication terminal and the identifier of the power line communication transmitter;

the first processing unit is further configured to store the identifier of the communication terminal in the history matching record and store the matching state of the communication terminal as successfully-matched, when the detection result is yes;

wherein the communication terminal, comprising:

the switch provided between a power supply device and the inverter, configured to disconnect or connect a connection between the power supply device and the inverter;

a second sending unit, configured to send the joining request message, the joining request message comprising the identifier of the communication terminal;

a second receiving unit, configured to receive the joining response message which is sent by the power line communication transmitter after determining the matching state of the communication terminal being unmatched;

a verification unit, configured to verify the identifier of the communication terminal in the joining response message;

a second processing unit, configured to store the identifier of the power line communication transmitter in the joining response message and control the switch of the communication terminal to turn on, when verification of the verification unit is passed; wherein:

the second sending unit is further configured to send the acknowledgment request message to the power line communication transmitter;

the second receiving unit is further configured to receive the acknowledgment response message which is sent by the power line communication transmitter after determining that the voltage on the power line between the communication terminal and the inverter corresponding to the power line communication transmitter is within the preset voltage range;

the verification unit is further configured to verify the identifier of the communication terminal and the identifier of the power line communication transmitter in the acknowledgment response message;

the second receiving unit is further configured to store the identifier of the power line communication transmitter in a matching record of the communication terminal when verification for the acknowledgment response message is passed.

* * * * *